United States Patent [19]

Lueers

[11] Patent Number: 4,840,125
[45] Date of Patent: Jun. 20, 1989

[54] APPARATUS FOR RAIL OPERATION COMPRISING A LONG-STATOR LINEAR MOTOR

[75] Inventor: Wilbrand Lueers, Braunschweig, Fed. Rep. of Germany

[73] Assignee: Siemens Aktiengesellschaft, Munich, Fed. Rep. of Germany

[21] Appl. No.: 204,227

[22] Filed: Jun. 9, 1988

[30] Foreign Application Priority Data

Jul. 6, 1987 [DE] Fed. Rep. of Germany ....... 3722295

[51] Int. Cl.$^4$ .............................................. B60L 13/10
[52] U.S. Cl. ...................................... 104/292; 246/8; 318/135
[58] Field of Search ........................ 104/290, 292, 303; 246/3, 8; 191/10, 14; 318/135; 310/12, 13

[56] References Cited

U.S. PATENT DOCUMENTS 3,740,549  6/1973  Thorne-Booth ................... 246/8 X
4,068,152  1/1978  Nakamura et al. ............. 104/292 X
4,454,457  6/1984  Nakamura et al. ............. 104/292 X

FOREIGN PATENT DOCUMENTS 2912837  11/1980  Fed. Rep. of Germany .
39114    3/1977  Japan ................................... 318/135

Primary Examiner—Johnny D. Cherry
Assistant Examiner—Joseph D. Pape

[57] ABSTRACT

In the operation of railways with long-stator linear motors, the drive energy is to be applied to the vehicle from a distributing sub-station with optimally-low losses. This presumes that the entire line is not constantly supplied with energy, but is only supplied with energy in sub-regions. Only such sub-regions are to be supplied with propulsion energy in a time-suitable manner, dependent on the location of the vehicle. The propulsion traveling wave winding is sub-divided into successive sections that can be supplied with propulsion energy from the distributing sub-stations with the assistance of separate switches. A crossed double line is, likewise, divided into sections and is provided parallel to the sections, the portions of the crossed double line overlapping. The individual sections are connected to a stationary central station, which receives signals output by the vehicle in a section-associated manner. These signals serve the purpose of controlling the switches for the turn-on and turn-off of the propulsion energy.

1 Claim, 1 Drawing Sheet

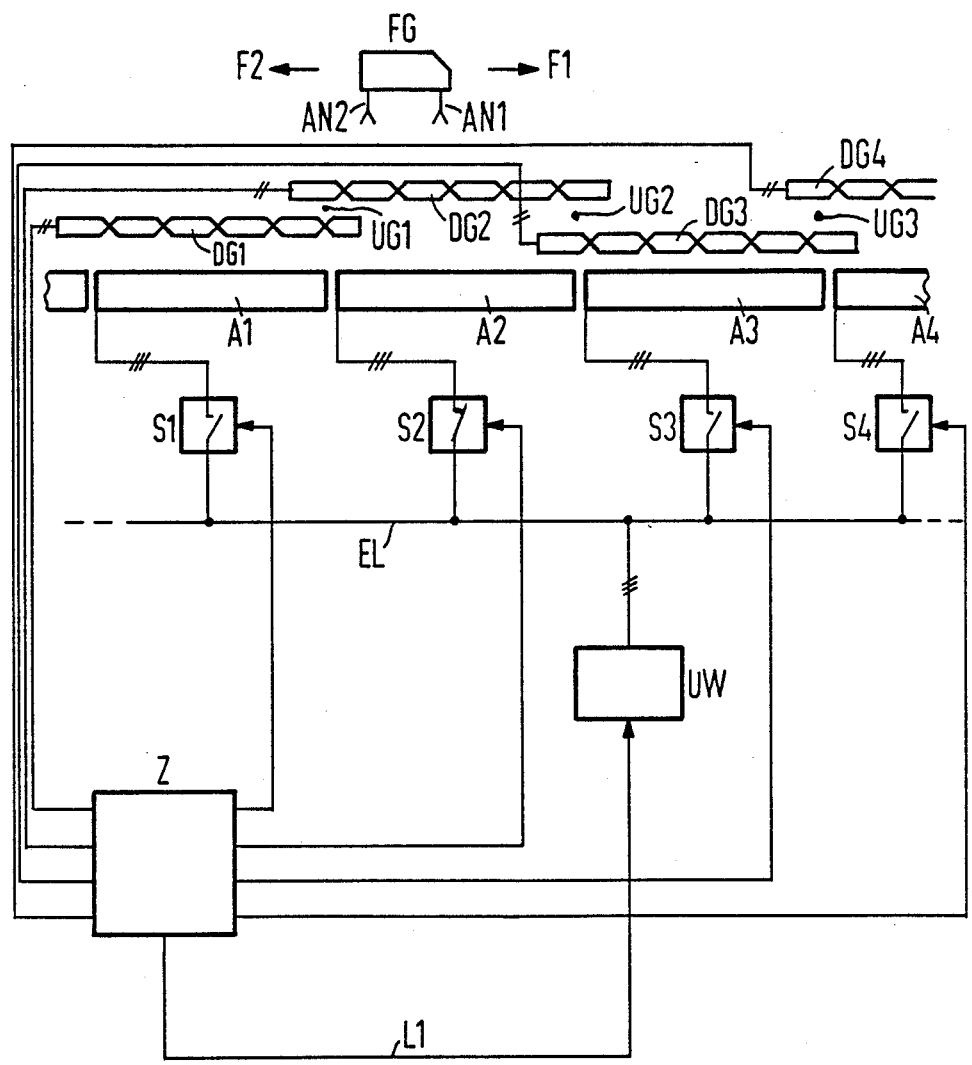

APPARATUS FOR RAIL OPERATION COMPRISING A LONG-STATOR LINEAR MOTOR

BACKGROUND OF THE INVENTION

1. Field of the Invention

The present invention is related to an apparatus for rail operation comprising a long-stator linear motor, whereby a propulsion traveling wave winding, fed by a distributing substation and a double line parallel thereto that is crossed at regular intervals and is connected to a stationary central station, are laid along the travel path and the vehicles carry at least one antenna that is arranged in a vehicle-symmetrical manner and is inductively coupled to the double line for data exchange with the central station.

2. Description of the Prior Art

An apparatus of the type generally set forth above is disclosed in detail in the German Application 29 12 837, and essentially serves the purpose of acquiring the pole position and of generating an unambiguous pole position signal. The acquisition of the pole position thereby occurs with the assistance of two transmission equipment at the side of a vehicle that act on a control central station via a testing line crossed in twice the space of the pole division. In addition, the equipment present on the vehicle are suited for enabling a data exchange with the stationary control central station via the individual antennas attached to the vehicle and via the testing line on the side of the rail line.

In operation of railways comprising long-stator linear motors, there is the task of supplying the drive energy of a distributing sub-station to the vehicle with optimally-low losses. The reactive power losses and remagnetization losses should be reduced.

SUMMARY OF THE INVENTION

The object of the invention is to improve an apparatus of the type set forth above such that an optimum feed of the required drive energy from the distributing sub-station is enabled without employing an additional punctiform locating system.

The above object is achieved, according to the present invention, in that the propulsion traveling wave winding is divided into individual sections that can be respectively, separately supplied, and the double line is divided into sections of corresponding length that overlap with a prescribed length at the section boundaries; in that the signals output by the vehicle and received in the central section are used for switching the propulsion energy on for the respectively assigned section of the propulsion traveling wave winding.

Advantageously, the control of the propulsion energy with the assistance of the apparatus of the present invention requires an absolute minimum of additional equipment, since the existing equipment can be co-utilized for optimum control of the long-stator linear motor and for data exchange between the vehicle and a stationary station. Therefore, it is of no consequence whether the vehicles are equipped with only a single antenna attached in a vehicle-symmetrical fashion, or are equipped with two antennas attached to the front and the rear of the vehicle, respectively. In the former case, the overlap zones of the double line must be larger in view of a prior engagement of the drive energy of the next section of the propulsion traveling wave winding respectively lying ahead in the travel direction in due time than given use of vehicles that are equipped with a respective antenna at the front and at the rear.

BRIEF DESCRIPTION OF THE DRAWING

Other objects, features and advantages of the invention, its organization, construction and operation, will be best understand from the following detailed description, taken in conjunction with the accompanying drawing, on which there is a single figure, which is a schematic illustration of the apparatus of the present invention.

DESCRIPTION OF THE PREFERRED EMBODIMENT

The drawing schematically illustrates the portion of a railway comprising a long-stator linear motor. A propulsion traveling wave winding along the travel path is divided into sections A1, A2, A3 and A4 with the object of reducing the reactive power losses and remagnitization losses. This is realized in that only that portion of the propulsion traveling wave winding of the entire railway line in which a vehicle FG is located, is supplied with propulsion energy. The individual sections A1-A4 of the propulsion traveling wave winding are connected, in a time-suitable manner, to an energy supplied cable EL by way of switches S1, S2, S3, S4, etc., assigned to these stations, the energy supply cable EL receiving the respectively required propulsion energy from a distributing sub-station UW.

The illustrated exemplary embodiment also shows a crossed double line parallel to the propulsion traveling wave winding comprising the sections A1-A4. This crossed double line being likewise divided into sections that are referenced DG1, DG2, DG3 and DG4. The individual sections of the crossed double line, for example, the section DG1, or at least exactly as long as the assigned section A1 of the propulsion traveling wave winding. Also added thereto is a prescribed overlap region with the respective adjacent section, for example the section DG2, of the crossed double line in the region of the section boundaries of two successive sections, for example the sections A1 and A2, of the propulsion traveling wave winding. The individual overlap regions are referenced UG1, UG2 and UG3. The vehicle FG is equipped with two antennas AN1 and AN2 that are attached to the front and the rear of the vehicle such that a data exchange with a stationary central station Z can occur by inductive coupling via the crossed double line. To this end, the individual sections DG1, DG2, DG3 and DG4 are connected to the stationary central station by way of separate lines. These devices, and a fixed topical assignment of the crossed double line to the propulsion traveling wave winding, not only enables the generation of unambiguous pole position signals for accurate propulsion control of the vehicle FG, but also enables the calculation of quantities relating to the vehicle movement. In the foreground, however, is the fact that a section-selective vehicle locating is established in the stationary central station in an extremely simple manner by reception of the information output by the vehicle FG, specifically by recognizing a carrier signal. When, as shown in particular, the vehicle FG is located in the region of the section A2 of the propulsion traveling wave winding, the section DG2 of the crossed double line receives the signals output by the vehicle FG. Simultaneously, these signals can then serve for control of the system, i.e., for closing the switch S2. Since all other sections DG1, DG3 and, respectively, DG4 of the crossed double line do not receive any signals at that time, the remaining switches S1, S3 and S4 remain open, whereby the sections A1, A3 and A4 of the propulsion traveling wave winding assigned thereto are not supplied with propulsion energy. Unnecessary reactive power losses and remagnetization losses are, therefore, avoided in an advantageous manner.

It is a known fact that the propulsion energy to be switched on for a section is not immediately available for the vehicle after a cut-in signal, since, for example, the switches S1–S4 work with an unavoidable turn-on delay. The overlaps UG1, UG2 and, respectively, UG3 of the sections of the double crossed line, therefore, serve the purpose of compensating these turn-on delays. Therefore, for example, the antenna AN1, given a travel direction F1, not only transmits in the section DG2 of the crossed double line before leaving the section A2 of the propulsion traveling wave winding, but also transmits in the section DG3. By receiving the section-selective signals related thereto, the stationary central station Z can, therefore, close the switch S3 in advance on the basis of a control signal such that adequate propulsion energy is applied in the section A3 when the vehicle FG enters into this part of the propulsion traveling wave winding. A corresponding situation applies by analogy, given a travel direction F2 with respect to the antenna AN2 when the section A2 is exited and the section A1 is entered.

The stationary central station Z is connected to the distributing sub-station UW via a line L1. Since, as was already set forth above, the stationary central station Z is aware of the quantities relating to vehicle movement that ought to be taken into consideration for the control of the vehicle FG, for example, the exact travel location and the speed. These quantities can serve the purpose of controlling the frequency of the propulsion energy.

Although I have disclosed my invention by reference to a particular illustrated embodiment thereof, many changes and modifications of the invention may become apparent to those skilled in the art without departing from the spirit and scope of the invention. I, therefore, intend to include within the patent warranted hereon all such changes and modifications as may reasonably and properly be included within the scope of my contribution to the art.

I claim:

1. In an apparatus for rail operation of the type which comprises a long-stator linear motor, in which a propulsion traveling wave winding is supplied by a distributing sub-station parallel thereto, a double line which is crossed at regular intervals and is connected to a stationary central station are positioned along the path of travel, and in which a vehicle carries at least one antenna arranged in a vehicle-symmetrical manner and is inductively coupled to the double line for data exchange with the central station, the improvement wherein:

said propulsion traveling wave winding is divided into individual sections, each of said sections being separately supplied with propulsion energy, said double line is similarly divided into sections of corresponding lengths that overlap with a predetermined length at the section boundaries;

a vehicle traveling said railway includes means for generating signals which are transmitted by said at least one antenna in a section; and a control means for receiving said signals and producing control signals for the section; and switch means connected to said control means and to said sections and responsive to said control signals for controlling the energization of said sections.

* * * * *